Nov. 23, 1965   W. P. KRAUS ETAL   3,218,704
METHOD FOR FABRICATING HIGH STRENGTH WALL STRUCTURES
Filed Dec. 12, 1961   2 Sheets-Sheet 1
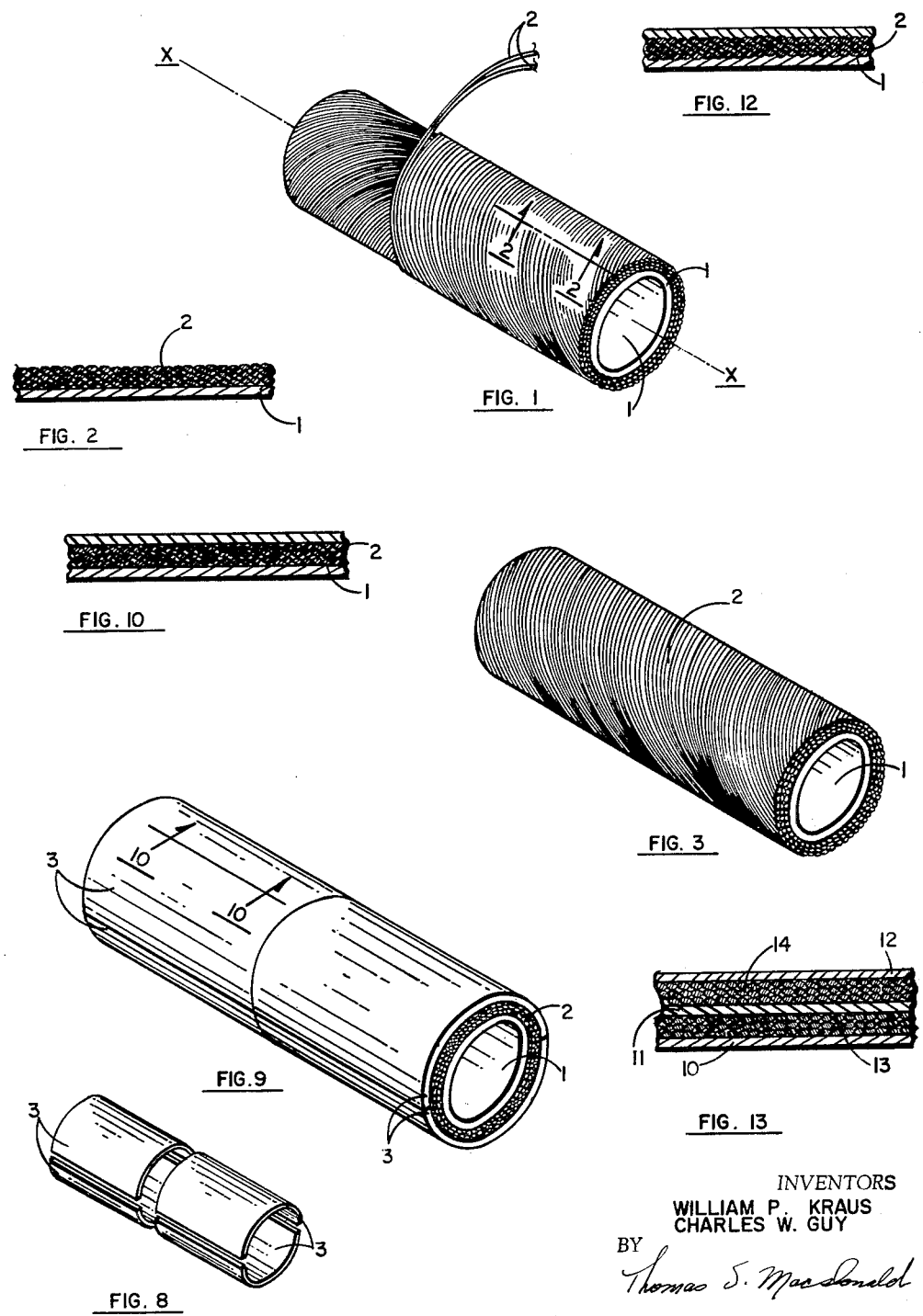
INVENTORS
WILLIAM P. KRAUS
CHARLES W. GUY
BY
Thomas S. MacDonald
ATTORNEY

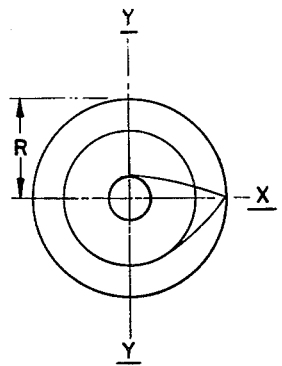
FIG. 5
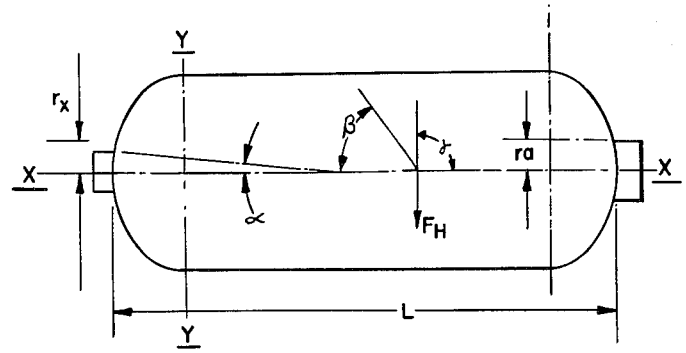
FIG. 4
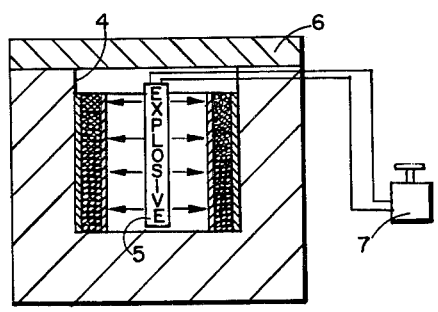
FIG. 11
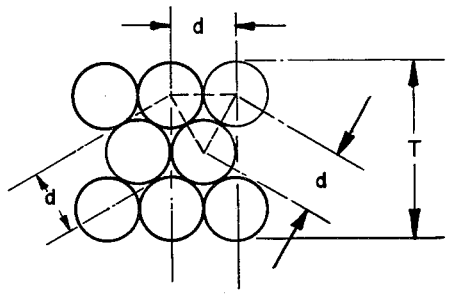
FIG. 7
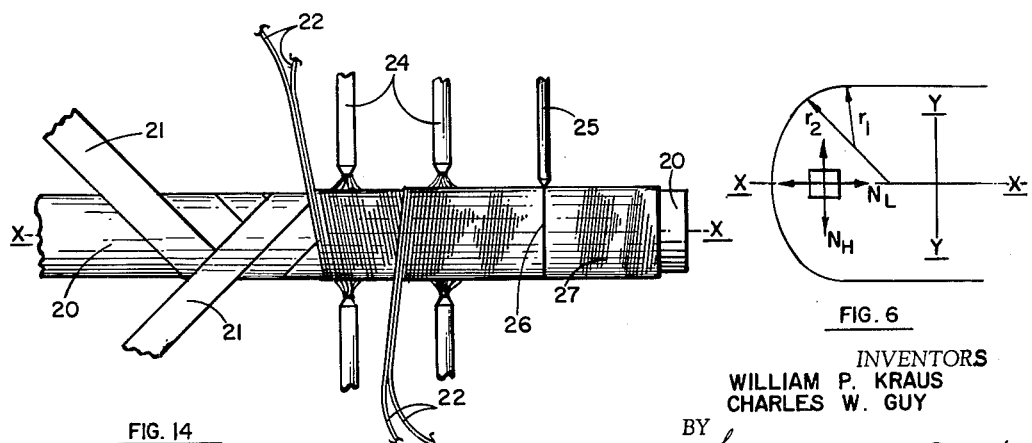
FIG. 14
FIG. 6
INVENTORS
WILLIAM P. KRAUS
CHARLES W. GUY
BY Thomas S. MacDonald
ATTORNEY United States Patent Office 3,218,704
Patented Nov. 23, 1965

3,218,704
METHOD FOR FABRICATING HIGH STRENGTH WALL STRUCTURES
William P. Kraus, Whittier, and Charles W. Guy, Northridge, Calif., assignors to North American Aviation, Inc.
Filed Dec. 12, 1961, Ser. No. 158,713
7 Claims. (Cl. 29—471.1)

This invention relates to a method for fabricating high strength wall structures and more particularly relates to a method for fabricating ultrahigh strength and lightweight pressure vessels by explosively integrating high strength wire filaments with one or more metallic layers.

Utilization of helically wound reinforcing filaments, per se, for increasing the hoop strength characteristics of a vessel or other tank type structure is known in the art. The optimum strength-to-weight ratios afforded when such wrappings are consolidated by means of conventional brazing or soldering techniques are greatly limited. Current wrapping techniques further comprise, for example, the encapsulation of wire or glass filaments in a plastic matrix such as a standard epoxy resin. Such organic type materials are brittle, temperature sensitive and unstable when subjected to extreme temperature environments. Further inadequacies with respect to such prior art methods are obvious when such formed vessels are used for the relatively long term storage of modern day rocket propellants, and the like. For example, the relatively large degree of radial expansion of propellants which are contained therein predicates that the containing vessel provide the utmost in pressure integrity. Structures which are formed by such conventional methods do not generally provide such desirata. Furthermore, the enlarged degree of axial bending which occurs in conjunction with booster tanks formed by such methods is ofttimes found to have a disadvantageous effect on the prescribed guidance and/or vectoring requirements.

This invention comprises an improvement over such above discussed prior art forming methods and also constitutes an improvement over the invention disclosed in U.S. Patent Office application Serial No. 851,054, now Patent No. 3,121,283, drawn to a Method For Pressure Welding Tanks. The method of the present invention essentially comprises the steps of selectively wrapping a deformable high strength wire filament onto a deformable metallic shell member and explosively forming said wire and said shell member together to thus afford a high strength unitary structure. The resulting structure provides for enhanced hoop tension characteristics, increased pressure integrity and improved strength-to-density values.

An object of this invention is to provide a method for forming high strength wall structures.

Another object of this invention is to provide a method for fabricating high strength wall structures wherein no deleterious heating of the component materials and formed structure occurs during the fabrication thereof.

A still further object of this invention is to provide an economical and expeditious method for forming high strength wall structures having enhanced hoop tension characteristics, increased pressure integrity and improved strength-to-density values.

These and other objects of this invention will become apparent from the following description taken in connection with the accompanying drawings, in which:

FIG. 1 discloses a first preferred step which may be used in the fabrication of a high strength wall structure;

FIG. 2 is a cross-sectional view taken on lines 2—2 in FIG. 1;

FIG. 3 discloses a shell structure as it would appear subsequent to the completion of the first step of FIG. 1;

FIG. 4 is a theoretical and longitudinal view of the basic design geometry utilized to carry forth the novel concepts of this invention;

FIG. 5 is an end view of the theoretical view of FIG. 4;

FIG. 6 is an enlarged view of one end of the theoretical view of FIG. 4;

FIG. 7 is a theoretical view similar to FIG. 4, disclosing a partial cross-sectional view of a typical wire wrapped structure;

FIG. 8 discloses four shell segments comprising an outer shell member;

FIG. 9 discloses the structure of FIG. 3 as it would appear with the shell segments of FIG. 4 constructed and arranged therearound;

FIG. 10 is a partial cross-sectional view taken on lines 10—10 in FIG. 9;

FIG. 11 discloses the structure of FIG. 9 as it would appear in a die cavity prior to the explosive fabrication thereof;

FIG. 12 is a partial cross-sectional view of the formed shell structure as it would appear subsequent to the explosive fabrication thereof;

FIG. 13 is an alternate wall structure which may be fabricated by the novel steps of this invention; and FIG. 14 discloses additional fabrication steps which may be employed with the novel concepts of this invention.

FIG. 1 discloses a first preferred forming step which may be used in the herein described method for fabricating a high strength wall structure. As shown, an inner shell member 1 is constructed and arranged on a longitudinal axis X—X and is adapted to have one or more filaments or wires 2 selectively and helically wrapped therearound. Although the illustration of FIG. 1 discloses the simultaneous wrapping of two individual wire members, it should be understood that one or more of such wires may be simultaneously utilized depending on the particular design requirements. It should be further noted that, if so desired, the inner shell member 1 may be placed on a suitable mandrel to aid in such a wrapping step.

FIG. 2 discloses a partial cross-sectional view showing the wrapped wires as comprising three layers. It should be understood that the particular number of layers of wires also depends on the specific work assignment. Further, the wires 2 may be selectively subjected to a predetermined tension which is in addition to the slight tension inherently imparted to the formed structure during the wrapping operation. Such a pretension step is advantageous in many applications to augment the tension which is applied to the formed structure during the explosive joining step, in order to substantially enhance the strength characteristics of the subsequently formed unit, i.e., to impart prestress characteristics thereto. In this respect, it should be noted that when employing such wrapped wire members having a predetermined diameter and tensile strength that it has been found advantageous in many applications to maintain the prestress tensions within the elastic range of said wire members. However, when it is desired to work harden said wire members, for example, such a pretension may be selected to exceed the elastic limit of said wire members by a predetermined amount depending on the particular degree thereof desired.

The inner shell member 1 preferably comprises a metallic constituent which will deform and provide an adequate bond with the wires 2 when subjected to a predetermined amount of explosive bonding force. For example, such materials as 6061 aluminum, 321 Cres steel and titanium 75 and the like have been utilized for the inner shell member 1. Other materials such as high and low carbon steels, stainless steels, nickel-base alloys and various metals such as titanium, molybdenum etc. may be employed. A typical thickness range of such shell members for many applications has been found to comprise one selected fom the range of from 0.002 in. to 0.20 in. Likewise, the wires 2 may comprise any preferably metallic material which will provide for an adequate explosively formed welding bond as well as the desired hoop stress characteristics in combination with the complementary formed shell member or members. It has been found that standard metallic constituents such as high-carbon steels, stainless steels, nickel-based alloys, tungsten, molybdenum, etc. may be readily used for said wires. A typical diameter range for said wires is from 0.001 in. to 0.010 in. with such wires having tensile strengths in the range of from 300K s.i. to 650K s.i. For example, a SAE 1085 standard steel wire having a diameter of 0.004 in. and a tensile strength of 525K s.i. has provided excellent results when utilized pursuant to the novel concepts of this invention. It should be noted that the specific characteristics of the wire chosen depend on the particular application and may, for example, fall outside of the above stated ranges.

FIG. 3 discloses the wires 2 as they would appear subsequent to the helical wrapping thereof around the inner shell 1. It is to be noted that the wires are shown for illustration purposes as helically wound with the alternate layers thereof substantially traversing the linear direction of the juxtaposed layer. Such an orientation of the wires may be used in many applications in order to lend additional multi-directional strength to the subsequently formed structure. In many applications it may prove desirable to employ holding means in the form of clamps, adhesive strips or the like (not shown) to prevent an unravelling of the wrapped wires prior to further forming steps.

FIGS. 4–7 disclose theoretical views of the variables which may be used to form a high pressure vessel in accordance with the novel concepts of this invention. It should be noted that although the formed structure of FIG. 3, for example, does not include end dome portions such portions are disclosed in the theoretical views of FIGS. 4–7 in order to more completely discuss the novel concepts of this invention. In this regard it should be noted that end dome portions are generally employed with pressure vessels and may be formed as an integral part of the fabricated structure before, during or subsequent to the explosive fabrication step. However, this particular discussion teaches the forming of the end dome portions simultaneously with the forming of the side walls of the vessel. Thus, the precise desired correlation between the axial and radial strength characteristics of the formed vessel may be readily achieved pursuant to the novel concepts of this invention. It should be further noted that end dome portions may not be desired in such applications as rocket motors, particular types of storage tanks, etc.

A typical cylindrically shaped pressure vessel is shown as comprising an overall length L, a cylindrical radius R, and respective aft and forward polar bosses having radii $r_a$ and $r_f$. Although it is generally advantageous to construct such polar bosses in an identical manner, such bosses may be dimensionally different, depending on the particular work application. The angles $\alpha$, $\beta$ and $\gamma$ (90°) are typically helix angles, measured with respect to the longitudinal axis X—X. As illustrated, a relatively small helix angle $\alpha$ functions to close out substantially more of the vessel end dome area than the larger angles $\beta$ or $\gamma$. Therefore, optimum end or axial strength characteristics may be imparted to the structure by utilizing a small angle $\alpha$, i.e., when $\alpha$ constitutes 0° maximum axial strength characteristics are achieved. Conversely, when $\alpha$ constitutes 90° or $\gamma$, maximum radial or hoop strength characteristics are realized. Thus, the desired ratio of axial-to-radial strength characteristics may be designed into the system. Such a ratio will of course depend on the particular application.

The general expression for a given helix winding angle $\beta$ is:

$$\beta = \tan^{-1}\frac{(r_1+r_2+nR)}{L_\beta} \quad (1)$$

wherein:

$n$ = a constant preferably selected from the range of from 0 to 15, chosen to satisfy a specific design and fabrication requirement $L_\beta$ = the overall length of the $\beta$ winding measured on the longitudinal axis $R$ = the cylindrical radius of the vessel $r_1$ and $r_2$ = the compound radii of the end domes Solution of this equation for any specified application will afford a range of workable winding angles. As above stated, the minimum helix angle $\alpha$ is a special case when it is equal to zero and thus, affords a maximum strength characteristic for the axial load carrying component $N_L$ (FIG. 6). Since the hoop load carrying component $N_h$ of the laminate produced with this low-angle $\alpha$ is very small, another larger angle $\beta$ is chosen for one or more of the wrapped layers. It has been found that it is preferable in most applications to employ an angle $\beta$ selected from the range of 30° to 60°.

It should be particularly noted that in the forming of a vessel that the ends of said vessel may be shaped to optimize the load carrying capabilities of the wrapped filaments. As hereinbefore stated, the number of layers of wrapped wires depends on the particular design application. Furthermore, it should be understood that the above set forth Formula 1 may be used to vary the degree of the angle $\beta$ for each wrapped layer. For example, one of the wrapped layers may comprise an angle $\beta$ of 90° so as to provide for additional hoop strength thereof. Also, it should be noted that the angle $\beta$ may be varied during the wrapping operation. Such may be desirable when the progressively helically wrapped wire is extended over the end dome portions of the vessel. Thus, a smooth transition from cylinder to end shape may be achieved. Such desirata comprise design characteristics which may be optimized to provide for a lightweight, balanced structure constructed pursuant to particular design requirements.

The novel concepts of this invention provide that a maximum volume fraction (WF), composite thickness (T) and density for any filament having a given diameter may be readily obtained. It must be assumed in the following additional theoretical analysis that the filament surfaces are perfectly round and smooth, the circular cross-sections of the wires remain circular during the wrapping operation and maximum nesting and minimum spacing exists between the wrapped layers.

FIG. 7 discloses a partial cross-sectional view of three layers of helically wrapped wires. The design formula for the desired composite thickness of such wires is:

$$T = d[1+(N-1)\sin 60°] \text{ or}$$
$$T = (0.13397+0.86603N)d \quad (2)$$

where:

$T$ = composite section thickness
$N$ = number of layers of wires
$d$ = wire diameter The maximum volume fraction, WF, is the ratio of the filament area to the rectangular cross-sectional area and may be expressed as:

$$WF = \frac{0.7854N}{0.134+0.866N} \quad (3)$$

Such a volume fraction substantially comprises 0.785 for one layer, 0.842 for 2 layers and increases rapidly with the number of layers to 0.905.

The above described teachings may thus be used to assure the desired vessel strength characteristics. Also, by further utilizing inner and outer shell members which are explosively formed to provide a composite structure therewith, additional strength may be provided to the formed vessel. For example, by explosively fabricating thirteen layers of 0.004 in. diameter wire, having a composite thickness of 0.045 in. in combination with an outer aluminum shell member having a thickness of 0.006 in. and an inner shell member having a thickness of 0.020 in., a total thickness of 0.071 in. is obtained. A comparable Fiberglas type srtucture would require a wall thickness of 0.158 in. to afford strength characteristics approaching the above structure whereas a unitary steel vessel type structure would necessitate a thickness of 0.076 in. The weight of such a wire wrapped structure would be substantially the same as that of the Fiberglas shell structure, per se. However, it should be noted in this regard that such a Fiberglas system further requires a liner which liner represents an additional weight penalty of approximately 23% of the total weight. Such a liner is necessitated primarily due to the chemical incompatability of most rocket propellant constituents when they encounter Fiberglas type materials. It should be further noted that the wire wrapped structure of this invention provides an axial rigidity ratio which is approximately twice that provided by a like Fiberglas type structure. Also, a comparable unitary steel structure would have to constitute approximately 30% more weight than the aforedescribed comparable wire wrapped system of this invention. Therefore, it can be seen that such an exposively fabricated wire wrapped structure has many advantages over both the Fiberglas and unitary steel type prior art tank structures.

It should be understood that it may be desirable in many applications to directly subject the shell-wire filament structures of FIG. 3 to an explosive welding step. However, hereinafter set forth method steps may be additionally used depending on the particular application.

FIG. 8 discloses four outer shell segments 3 which together preferably comprise a slightly larger diameter than that of the initially formed inner shell 1—wire filament 2 unit. It should be noted that one cylindrically shaped outer shell member 3 may be utilized in lieu of the four segments as shown in FIG. 4, for example. Also, the individual segments may be so constructed and arranged so as to comprise three or more individual segments. It should be further noted that metallic strip members, such as those described in the hereinbefore set forth patent application Serial No. 851,054, may be used in one or more of the wrapping steps. Such design considerations will of course depend on the specific work application.

FIG. 9 discloses the outer shell segments of FIG. 8 as they would appear in surrounding relationship with respect to the wire wrapped structure shown in FIG. 3. The outer shell segments 3 may be secured together and fixedly retained thereat by means of adhesive strips or any other standard fastening means (not shown).

FIG. 10 discloses a partial cross-sectional view taken on lines 10—10 in FIG. 9 and discloses the juxtaposed structural relationship of the inner shell 1, the intermediate wires 2 and the outer shell 3. Although three such wire layers are shown for illustration purposes, it should be understood that the number thereof depends on the particular design requirements, as hereinbefore discussed in connection with FIG. 7.

The unit disclosed in FIG. 9 is subsequently constructed and arranged within a die cavity 4 as shown in FIG. 11. The die cavity 4 is constructed and arranged to conform to the desired outer peripheral configuration of the completed structure. A conventional explosive means 5 is constructed and arranged within the die cavity 4 and a cover 6 optionally placed thereon in some work applications in order to more positively confine the explosive forces therein. However, it should be understood that it may not be desirable to utilize such a cover in many work applications. The particular explosives used and the specific construction and arrangement thereof relative to the formed structure is a matter of choice and design depending upon the particular work application. An air or water medium, for example, may be contained in the die cavity 4 formed by the inner shell 1 in order to efficiently transmit the compressive forces to the explosively formed structure. As above stated, the particular explosive material utilized depends on the particular design requirements and may comprise any conventional type of explosive such as dynamite, pentaerythritol tetranitrate (PETN), trinitrotoluene (TNT), or the like.

The explosive charge may be conveniently operatively connected to a detonator 7 situated on the exterior of the die cavity 4 for safety purposes. The explosive charge 5 is then actuated to explosively form and integrate the wire filaments 2 between the inner shell 1 and the outer shell 3 as shown in FIG. 12. As shown, the wires 2 tend to migrate into and are positively contained by the matrix materials comprising the inner shell 1 and the outer shell 3. For example, observance of a 500X magnification photomicrograph taken on a particular formed specimen has disclosed that each of the matrix materials has substantially flowed into the microscopic irregularities formed on the wires. Thus, an integrated ultrahigh strength wall structure is formed. As hereinbefore described, the strength characteristics of such a formed structure can be tailored to design requirements by a particular selection of the number of wires per square cross-sectional area, the particular orientation of such wires, the type of constituent used for the wires and shell members, etc. For example, a standard aluminum-parent specimen affords a strength-to-density value of approximately 180,000 inches. A particular explosively fabricated aluminum sheet and steel wire specimen has been found to afford a strength-to-density value of approximately 350,000 inches. By increasing the number of wires to a maximum saturation strength in accordance with the above discussion, strength-to-density values in the range of 1,800,000 inches can be realized.

FIG. 13 discloses an alternative embodiment disclosing the versatility of the novel concepts of this invention. As illustrated, three respective shell members 10, 11 and 12 can be integrated with wire layers 13 and 14. It should be also noted that depending on the particular design considerations, various combinations of wire filament and shell members may be used. For example, it may be desirable to use a single shell member with a single wrapped wire filament layer, said wire layer either being wrapped internally or externally thereof.

FIG. 14 discloses alternative or additional steps which may be employed with the hereinbefore described fabrication method of FIGS. 1-13. A mandrel 20 is constructed and arranged to have one or more layers of metallic foil 21 wrapped therearound. In accordance with the previous discussions, the particular angle which such foil forms with the longitudinal axis X—X depends on the specific design requirements. Also, the metallic foil or strip members 21 may be continuously and helically wrapped in opposite directions, as illustrated, in order to impart unidirectional strength characteristics to the formed structure. It should be understood that the mandrel 20 may be rotated to thus form the wrapped structure thereon or conversely, the mandrel may be held stationary with the strips 21 wrapped thereon.

One or more layers of wire filaments 22 may then be wrapped over the foil, also in accordance with the hereinbefore discussed theoretical design analysis. The helically wrapped wire filaments 22 may then be sprayed with a molten metal 23 discharged from nozzles 24. Such a spraying step may be carried forth during the wrapping operation or thereafter in order to penetrate and smooth over the interstices occurring between the filaments. Thus, the intimate contact between the wire filaments and foil is greatly improved thereby providing for an enhanced filament wire-to-foil bond. Such a molten metal spray may comprise aluminum, magnesium or the like which metal is at the desired pressures, temperatures, etc. in order to provide an intimate contact with the wire filaments 22 as above described. Additional wire filaments 22 may then be applied to the structure over the sprayed molten metal, if so desired.

A cutting means 25 may be employed to sever the tubular structure to the desired length at 26. The tubular sections 27 may then be inserted in a female die such as the one hereinbefore described in connection with FIG. 11 and subsequently subjected to explosive forming forces in the manner hereinbefore described. It should be again noted that end dome portions may be secured to such a fabricated cylindrically shaped structure before, during or after the explosive forming operation.

Although this invention has been described and illustrated in detail, it is to be understood that the same is by way of illustration and example only and is not to be taken by way of limitation, the spirit and scope of this invention being limited only by the terms of the appended claims.

We claim:

1. A method for explosively forming an imperforate hollow metallic structure on a longitudinal axis comprising the steps of forming a first metallic shell member on said axis, spiral wrapping metallic wire on said first shell member at a predetermined wrapping angle relative to said axis to form at least one wire layer, forming a second metallic shell member on said wire layer, holding said first and second shell members and said wire layer in fixed position relative to each other, discharging an explosive force internally of and against said first shell member and preventing substantial outward movement of said second shell member relative to said axis whereby said first and second shell members and said wire layer are explosively welded into an imperforate, hollow metallic structure.

2. The invention of claim 1 wherein said predetermined wrapping angle of said wire is selected from a range of from 30° to 60°.

3. The invention of claim 1 including the step of pretensioning said metallic wire at a predetermined pressure during said spiral wrapping step.

4. A method for explosively welding a high strength, imperforate, hollow metallic structure on a longitudinal axis comprising the steps of forming a first metallic shell member on said axis, spiral wrapping first metallic wire on said first shell member at a first predetermined wrapping angle relative to said axis to form a first wire layer, spiral wrapping second metallic wire on said first metallic wire at a second wire predetermined wrapping angle relative to said axis to form a second wire layer, said second wrapping angle being different than said first wrapping angle, forming a second metallic shell member on said second wire layer, holding said shell members and wire layers in fixed position relative to each other, discharging an explosive force internally of and against said first shell member and preventing substantial outward movement of said second shell member relative to said axis whereby said shell members and said wire layers are explosively welded into an imperforate, hollow structure.

5. The invention of claim 3 further comprising the step of spraying a molten metal on the periphery of said first wire layer prior to the spiral wrapping of said second wire layer thereon.

6. A method for explosively welding a high strength, imperforate pressure vessel on a longitudinal axis, said pressure vessel terminating in end dome portions at both ends thereof comprising the steps of forming a first metallic shell member on said axis, spiral wrapping metallic wire on said first shell member at a wrapping angle relative to said axis according to the expression:

$$\beta = \tan^{-1}\frac{(r_1 + r_2 + nR)}{L_\beta}$$

wherein:

$\beta$ = wrapping angle, $n$ = a constant selected from the range of from 0 to 15, chosen to satisfy a specific design and fabrication requirement, $L_\beta$ = overall length of the winding measured along the longitudinal axis, $R$ = cylindrical radius of the vessel, $r_1$ and $r_2$ = compound radii of the end dome portions of the vessel, forming a second metallic shell member on said wrapped wire, holding said shell members and said wrapped wire in fixed relation relative to each other, discharging an explosive force internally of said first shell member and preventing substantial outward movement of said second shell member relative to said axis whereby said shell members and said wrapped wire are explosively welded into a high strength, imperforate pressure vessel.

7. The invention of claim 6 including the step of forming the spiral wrapped wire to a composite layer thickness in accordance with the following expression:

$$T = (0.13397 + 0.86603N)d$$

where:

$T$ = composite layer thickness of the wrapped wire
$N$ = number of wrapped wire layers
$d$ = diameter of the wire

References Cited by the Examiner

UNITED STATES PATENTS

| | | | |
|---|---|---|---|
| 2,109,529 | 3/1938 | Goddard. | |
| 2,189,785 | 2/1940 | Fahoney. | |
| 2,370,677 | 3/1945 | Mapes. | |
| 2,371,107 | 3/1945 | Mapes | 29—452 |
| 2,600,630 | 6/1952 | Fergusson | 29—471.1 X |
| 2,685,979 | 8/1954 | Zeek et al. | |
| 3,023,495 | 3/1962 | Noland | 29—423 X |
| 3,036,374 | 5/1962 | Williams. | |
| 3,047,191 | 7/1962 | Young | 29—452 X |
| 3,055,095 | 9/1962 | Barry | 29—421 |
| 3,121,283 | 2/1964 | Kaempen | 29—471.1 |

JOHN F. CAMPBELL, *Primary Examiner.*